(12) United States Patent
Brewster et al.

(10) Patent No.: US 10,093,492 B2
(45) Date of Patent: Oct. 9, 2018

(54) MATERIAL DELIVERY SYSTEM

(71) Applicant: IPEG, INC., Cranberry Township, PA (US)

(72) Inventors: Douglas E. Brewster, Harrisville, PA (US); Keith J. Salamony, Clairton, PA (US); Jeffrey S. Rickert, Cranberry Township, PA (US); Robert G. Criswell, Tionesta, PA (US); Brian L. Dowler, Cranberry Township, PA (US)

(73) Assignee: IPEG, INC., Cranberry Township, PA (US)

( * ) Notice: Subject to any disclaimer, the term of this patent is extended or adjusted under 35 U.S.C. 154(b) by 0 days.

(21) Appl. No.: 15/657,339

(22) Filed: Jul. 24, 2017

(65) Prior Publication Data

US 2017/0320681 A1    Nov. 9, 2017

Related U.S. Application Data

(62) Division of application No. 15/008,862, filed on Jan. 28, 2016.

(60) Provisional application No. 62/135,369, filed on Mar. 19, 2015.

(51) Int. Cl.
*B65G 53/66*    (2006.01)

(52) U.S. Cl.
CPC ................... *B65G 53/66* (2013.01)

(58) Field of Classification Search
CPC ........ B65G 53/14; B65G 53/22; B65G 53/24; B65G 53/28; B65G 53/66; B65G 53/52; B65G 53/525; F27D 3/18; F27D 2003/185

USPC ..... 406/14, 28, 85, 127, 144, 151, 169, 175, 406/197

See application file for complete search history.

(56) References Cited

U.S. PATENT DOCUMENTS

| | | | | |
|---|---|---|---|---|
| 3,690,732 A | * | 9/1972 | Wasp | F17D 1/088 406/50 |
| 3,806,001 A | * | 4/1974 | Pratt | A23K 40/00 222/1 |
| 3,923,343 A | * | 12/1975 | Bird | B65G 53/66 406/14 |
| 4,067,622 A | * | 1/1978 | Krambrock | B65G 53/521 406/85 |
| 4,261,672 A | | 4/1981 | Marbach | |
| 4,420,279 A | * | 12/1983 | Easley, Jr. | B65G 53/14 406/14 |
| 4,490,077 A | * | 12/1984 | Shimada | G01F 1/74 406/124 |
| 4,502,819 A | * | 3/1985 | Fujii | B65G 53/22 406/132 |
| 4,515,503 A | * | 5/1985 | Snowdon | B65G 53/525 406/11 |
| 4,582,454 A | * | 4/1986 | Brandenburg | B65G 53/66 110/104 R |
| 4,715,748 A | * | 12/1987 | Krambrock | B65G 53/525 406/11 |
| 4,775,267 A | | 10/1988 | Yamamoto | |

(Continued)

OTHER PUBLICATIONS

RayMas Non-contact Solids Flow Meter, webpage, Jan. 11, 2016.
Pneumatic Vacuum Conveying—Dilute and Dense Phase, webpage, Jan. 11, 2016, 9 pages.

*Primary Examiner* — Joseph A Dillon, Jr.
(74) *Attorney, Agent, or Firm* — Reed Smith LLP

(57) ABSTRACT

The invention relates to material delivery systems and particularly to pulse controlled material delivery systems.

6 Claims, 1 Drawing Sheet

(56) References Cited

U.S. PATENT DOCUMENTS

| | | | | |
|---|---|---|---|---|
| 4,861,200 A | * | 8/1989 | Lubbehusen | B65G 53/521 406/11 |
| 4,883,390 A | * | 11/1989 | Reintjes | B65G 53/66 406/124 |
| 4,909,676 A | | 3/1990 | Heep et al. | |
| 4,936,715 A | * | 6/1990 | Wolf | B65G 53/521 138/148 |
| 5,049,008 A | | 9/1991 | Baillie | |
| 5,056,962 A | * | 10/1991 | Morimoto | B65G 51/04 406/13 |
| 5,240,403 A | * | 8/1993 | McAnespie | F23G 7/068 110/190 |
| 5,285,735 A | * | 2/1994 | Motoi | F23K 3/02 110/101 CB |
| 5,562,366 A | | 10/1996 | Paulson | |
| 5,584,612 A | * | 12/1996 | Nolan | B65G 53/66 406/11 |
| 5,657,704 A | * | 8/1997 | Schueler | C21B 5/003 110/101 R |
| 5,775,851 A | * | 7/1998 | Waeschle | B65G 53/521 406/14 |
| 5,791,829 A | * | 8/1998 | Iltzsche | B65G 53/525 406/50 |
| 5,813,801 A | | 9/1998 | Newbolt et al. | |
| 6,106,202 A | | 8/2000 | Nolan | |
| 6,257,804 B1 | * | 7/2001 | Gathmann | B05B 7/144 406/138 |
| 6,287,056 B1 | | 9/2001 | Szikszay | |
| 6,386,800 B1 | * | 5/2002 | van Eyck | B65G 53/525 406/14 |
| 6,447,215 B1 | * | 9/2002 | Wellmar | B65G 53/66 406/11 |
| 6,588,988 B2 | | 7/2003 | Zlotos | |
| 6,786,681 B2 | * | 9/2004 | Grasshoff | B65G 53/521 406/11 |
| 7,080,960 B2 | * | 7/2006 | Burnett | B65G 43/08 406/11 |
| 8,113,745 B2 | | 2/2012 | Aoki | |
| 8,360,691 B2 | | 1/2013 | Moretto | |
| 8,491,228 B2 | | 7/2013 | Snowdon | |
| 8,690,487 B2 | | 4/2014 | Müller et al. | |
| 8,767,214 B2 | | 7/2014 | Romanin et al. | |
| 2005/0158187 A1 | | 7/2005 | Fulkerson et al. | |
| 2005/0183574 A1 | * | 8/2005 | Burnett | B65G 53/10 95/271 |
| 2006/0039762 A1 | * | 2/2006 | Ziwica | B05B 7/1404 406/93 |
| 2006/0151053 A1 | * | 7/2006 | Boroch | B65G 53/16 141/83 |
| 2008/0131214 A1 | * | 6/2008 | Krebs | B65G 53/08 406/14 |
| 2009/0148244 A1 | * | 6/2009 | Snowdon | B65G 53/66 406/28 |
| 2011/0052335 A1 | | 3/2011 | Haberl | |
| 2013/0101361 A1 | | 4/2013 | Rolland | |
| 2013/0209180 A1 | | 8/2013 | Moretto | |
| 2014/0245839 A1 | | 9/2014 | Romanin et al. | |
| 2015/0151319 A1 | * | 6/2015 | Michael | B05B 5/1683 118/300 |
| 2015/0232288 A1 | * | 8/2015 | De Jager | B65G 53/66 406/12 |

* cited by examiner

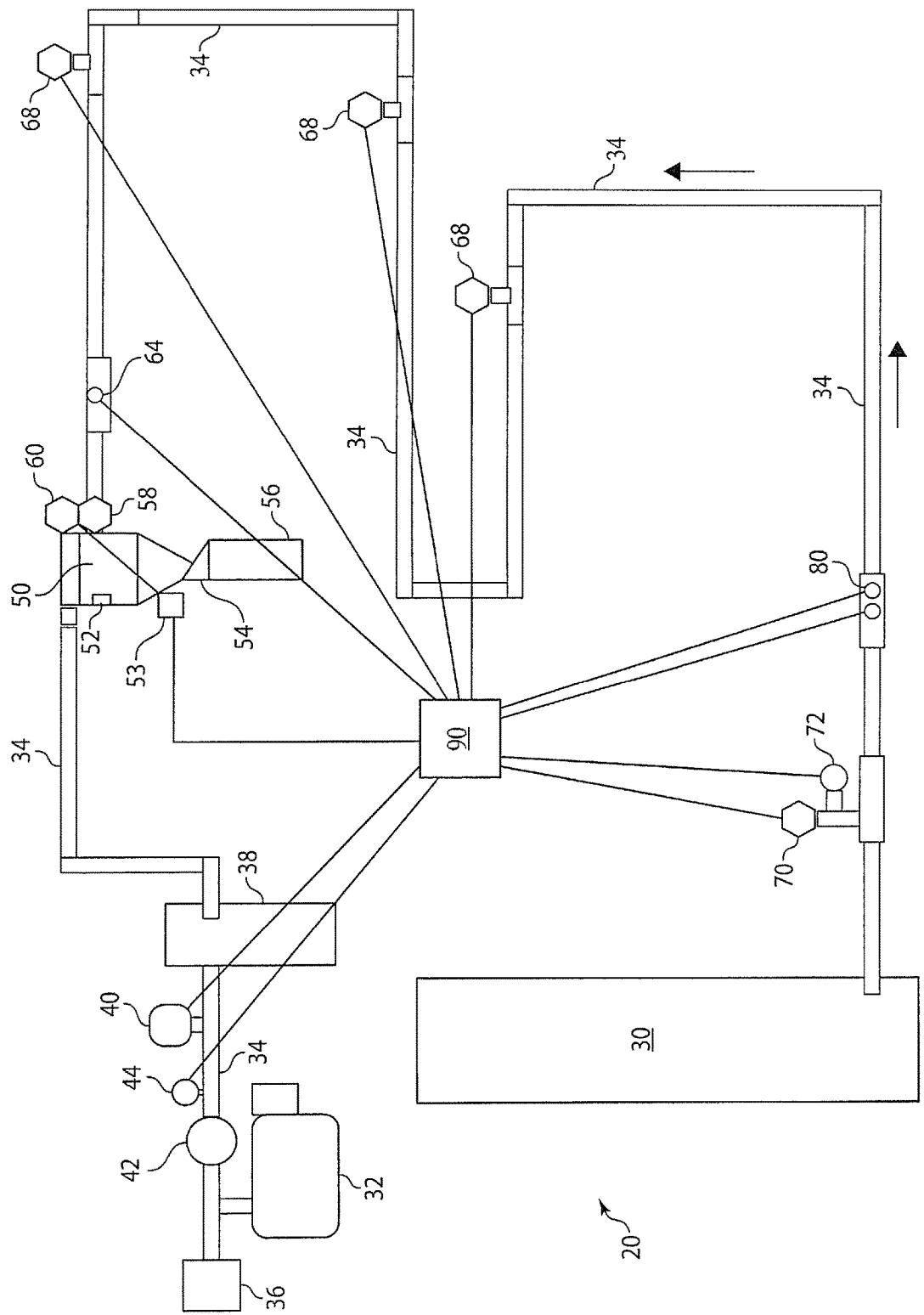

MATERIAL DELIVERY SYSTEM

CROSS-REFERENCE TO RELATED APPLICATION

This application is a divisional patent application of U.S. patent application Ser. No. 15/008,862 filed on Jan. 28, 2016, which claims the benefit under 35 U.S.C. §119(e) of the earlier filing date of U.S. Provisional Patent Application No. 62/135,369 filed on Mar. 19, 2015, the disclosure of which is incorporated by reference herein.

BACKGROUND

This application discloses an invention which is related, generally and in various embodiments to fluid material delivery systems. Prior dilute phase pneumatic material delivery systems conveyed materials through system piping in dilute phase at high speeds. In the prior dilute phase systems, the material being conveyed is mixed with the fluid used to deliver the material thus diluting the concentration of material in the piping of the system. In dilute phase systems, generally the solid to fluid ratio may be up to about 6. Because the material in the piping is diluted, the velocity of the material in the piping must be increased to attain the required volume of material to be delivered. In these prior systems the high speeds necessary to convey sufficient quantities of materials in the time allotted caused the material being conveyed to degrade. Degradation of the material being conveyed also generated dust and streamers that tended to clog the systems. The speed of the material being conveyed also caused wear and deterioration on the piping of the systems. Also, because the material being conveyed is diluted with the system fluid, measuring the amount of material being conveyed is difficult.

BRIEF DESCRIPTION OF THE DRAWINGS

FIG. 1 shows various components of one embodiment of the material delivery system.

DETAILED DESCRIPTION

It is to be understood that at least some of the descriptions and the FIGURE of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

The system described herein conveys material through system piping or conduits in pulses of relatively dense slugs or pistons of materials. Thus, rather than thoroughly mixing the system fluid with the material being conveyed, the current system significantly reduces the mixing of the system fluid with the material thereby increasing the density of the material flowing through the system piping. The pulsing of the system creates slugs or pistons of material moving through the system piping. In this type of system the solid to fluid ratio may be above 14. Because the material slugs are relatively dense, the velocity of the material slugs moving through the system piping may be reduced while increasing the amount of material being conveyed in the allotted time. Reducing the speed of material moving through the piping reduces degradation of the material and reduces degradation of the system piping. Also, since the material slugs are relatively dense, measurement of the system material throughput is greatly enhanced. The system can be operated in either intermittent and/or continuous modes, or in both at different times in the conveying cycle. The system allows the user the ability to adjust the delivery rate of the material in pounds per hour, higher or lower, with minimal or no changes in pump speed and/or frequency changes thus providing greater energy savings. The rate of material pulse can be varied by changing the pulse valve set-points. This method enhances the material delivery by increasing the length of the material slugs and increasing the overall density of the material being conveyed in the system piping. The system can be unplugged with a self-cleaning method by using control logic to open valves strategically positioned within the system. The system is able to convey blended materials in piping systems across short or long distances without the issues associated with material separation. The system may also be operated so that the system will automatically adjust to maintain desired throughput and desired material velocity.

Referring to FIG. 1, in one embodiment of the invention system 20 comprises a material source 30 which may be a source of material such as plastic beads, plastic resins, blended resins, powders, re-grind waste materials, cereal or candy for delivery to another point in system 20. A pump 32 which may be a vacuum pump such as a positive displacement claw pump having a 5 horse power motor and capable of developing up to about 25 inches of mercury vacuum pressure in a 2.5 inch line is connected to material source 30 by means of piping 34. Pump 32 may include a means to control the motor of pump 32 such as a variable frequency drive mechanism. Pump 32 may operate at about 25 to about 60 Hz and between about 1500 to about 3600 rpm. Pump 32 creates a suction in piping 34 so as to draw material from material source 30 through piping 34 toward pump 32. Pump 32 may be connected to a silencer 36 such as a muffler for reducing noise at the output of pump 32. Pump 32 may also be connected by piping 34 to a dust collector 38 for removing dust from piping 34.

An atmospheric valve 40 may be connected by piping 34 between the inlet to pump 32 and the outlet to dust collector 38. Atmospheric valve 40 may be opened to allow air into piping 34 to reduce the vacuum pressure in piping 34 without turning off pump 32 and to cool pump 32.

A protection filter 42, such as a cartridge filter, may be connected between pump 32 and dust collector 38 by piping 34 to provide a secondary filter in case any dust passes through dust collector 38. A pressure sensor 44 may be connected between protection filter 42 and atmospheric valve 40 by piping 34 for monitoring the pressure in piping 34. If pressure sensor 44 determines that the pressure in piping 34 exceeds a predetermined limit, pressure sensor 44 sends a signal to system 20.

A hopper loader 50 may be connected between dust collector 38 and material source 30 by piping 34. Hopper loader 50 collects material conveyed through system 20. Hopper loader 50 may have a load sensor 52 therein to determine when hopper loader 50 is filled and an empty sensor 53 to determine when hopper loader 50 is empty. Knowing the volume of hopper loader 50 between load sensor 52 and empty sensor 53, the volume of material in hopper loader 50 may be determined. A discharge valve 54 such as a flap valve, rotary airlock valve or air operated knife gate valve may be connected to hopper loader 50. When discharge valve 54 is opened, material may flow from hopper loader 50 to a container 56. Timers may also be used to start and stop the filling of containers 56. Additional containers 56 may be connected to discharge valve 54 so that multiple containers 56 may be filled in sequence. A loader valve 58 such as an air cylinder plunger style valve may be connected to piping 34 and to the entrance of hopper loader 50 to control the flow of material from piping 34 into hopper loader 50.

An automatic flush valve 60 may be connected to loader valve 58 at the inlet of hopper loader 50. Flush valve 60 may be an air cylinder plunger style valve. Flush valve 60 provides automatic flushing of the seals of loader valve 58 and the seals of automatic flush valve 60 with air, or other system fluid, to maintain those seals free of material.

A pulse sensor 64, which may be a proximity sensor, may be connected by piping 34 to the upstream side of hopper loader 50 for determining if material is flowing into hopper loader 50.

One or more auto clean valves 68, which may be plunger valves, may be connected in various locations to piping 34 for providing a means to clean piping 34. If pressure sensor 44 determines the pressure in piping 34 exceeds a certain limit, which may be due to piping 34 being clogged, the auto clean valve 68 closest to pump 32 is opened to the atmosphere to allow air into piping 34. The atmospheric air pressure should cause the clog to be removed if the clog is between that auto clean valve 68 and pump 32. If this does not clear piping 34, the clog in the line may be upstream of that auto clean valve 68. In which case, the first auto clean valve is closed and the auto clean valve further upstream is opened to the atmosphere. This sequence continues until material flows in piping 34.

A pulse control valve 70 may be connected by piping 34 to material source 30 for controlling the flow of material through system 20. Pulse control valve 70 may be an air cylinder operated full port valve. A trim valve 72 such as a one inch control ball valve with a servo control may be connected to pulse control valve 70 for introducing atmospheric air into piping 34 at a controlled rate. Trim valve 72 may be open approximately 10% of capacity during normal operation of system 20 which allows a small volume of atmospheric air to flow continuously in piping 34. During operation of system 20, pulse control valve 70 may be fully opened for about 2-4 second intervals which injects a pulse of material into piping 34. Between each such pulse, pulse control valve 70 is closed for about 0.3 of a second which stops the flow of material in piping 34. In one embodiment, pulse control valve 70 may be designed such that when open air is injected and when closed material is injected. Having a small continuous flow of air through trim valve 72 and through piping 34 reduces degradation of piping 34 when the material being conveyed is abrasive. However, when appropriate, pulse control valve 70 and trim valve 72 may stop the flow of air through system 20 between pulses, if desired. As an alternative, pulse control valve 70 could be open and the trim valve could be pulsed for 0.1-10 seconds to produce pulses of material. The pulses of material produced by pulse control valve 70 and trim valve 72 cause slugs of material to move from material source 30 through piping 34 to hopper loader 50. Varying the intensity and/or duration of the pulses can adjust the amount and velocity of material flowing through piping 34. For example, increasing the speed of the motor of pump 32 from about 29 Hz to about 39 Hz while maintaining trim valve 72 air flow at about 10% can quickly increase the material flow rate from about 3300 pounds per hour to about 4500 pounds per hour while maintaining the material flow speed through piping 34 at about 634 feet per minute. Thus, system 20 is capable of increasing the flow of material through system 20 without increasing the speed of the material thus reducing degradation of the material during the delivery process.

A pulse velocity sensor 80 may be connected between material source 30 and hopper loader 50 by piping 34. Pulse velocity sensor 80 may be used to monitor the velocity and length of the material slug passing through piping 34. Pulse velocity sensor 80 may include two high speed sensors such as mechanical switch, proximity, capacitance or photoelectric sensors to detect the presence and speed of material slugs moving through piping 34. As material flows through pulse velocity sensor 80, the first sensor detects the beginning of the flow of material and the end of the flow material from which the length of a slug of material may be determined. The first sensor may also measure the time between slugs of materials. As the material continues flowing through pulse velocity sensor 80, the second sensor detects the flow of material. Knowing the distance between when the first sensor and second sensor of pulse velocity sensor 80 and calculating the time between the first sensor and the second sensor detect material flow, the speed of material flowing through pulse velocity sensor 80, and thus through piping 34, can be calculated and controlled. Knowing the time between slugs of material, the length of a slug of material and the space between slugs of material, system 20 can calculate various flow rates and material delivery rates.

A control system 90 such as a programmable logic control or other logic style control system is connected to the various components of system 20 for controlling the various components of system 20. For example, data from pulse velocity sensor 80 may be communicated to control system 90 so that control system 90 may control pulse control valve 70 and trim valve 72 to control the flow of material through system 20.

In operation, system 20 and its components are controlled by control system 90. Initial set points are stored in control system 90 and can be modified to match system 20 parameters such as pump size, line sizes and distances. On startup, pump 32 and valves are off. Hopper loader 50 and pump 32 may remain enabled from the last operation or they can be enabled by the user. If hopper loader 50 and pump 32 are both enabled, control system 90 waits for a signal from empty sensor 53, which signals that hopper loader 50 needs more material. If load sensor 52 signals that hopper loader 50 needs more material, the loading process begins. The atmospheric valve 40 is closed and pump 32 is started by a signal sent from control system 90 based on the starting Hz set point (typically 30 Hz). Pulse control valve 70 begins to pulse on and off based on the starting set point (typically 2 seconds on and 0.3 seconds off). Trim valve 72 is opened to its starting set point (typically 10%). The loader valve 58 is opened and material begins to flow from material source 30 through piping 34. For example, in a normal loading sequence, hopper loader 50 may be loaded with a volume of 1 cubic foot and a material density of 35 pounds per cubic foot in about 55 seconds. With about a 5 second dump time, the average amount of material delivered through system 20 would be about 2,100 pounds per hour.

During loading, the pressure in piping 34 is measured by pressure sensor 44 and the speed of material through piping 34 is measured by pulse velocity sensor 80. A signal from pressure sensor 44 is transmitted to control system 90. If pressure sensor 44 determines that the pressure in piping 34 exceeds a certain limit automatic line clearing is performed as described above.

During operation of system 20, control system 90 monitors the performance of the various components of system 20. Control system 90 can monitor pulse velocity sensor 80 to determine the amount of material moving through system 20. Based on information from pulse velocity sensor 80, control system 90 can adjust pulse control valve 70 and trim valve 72 to increase the density and/or speed of the material flowing through system 20 and into container 56. For example, increasing the amount of time pulse control valve 70 is open will increase the amount of material in a particular slug of material. Similarly, decreasing the amount of air introduced in piping 34 through trim valve 72 will increase the density of a particular slug of material. For example, reducing trim valve 72 from 10% open to 5% open will approximately double the density of the slug of material. Conversely, increasing the amount of air introduced in piping 34 through trim valve 72 will reduce the density of a particular slug of material and increase its speed. Control system 90 can also control the performance of pump 32 to increase or decrease the pressure in piping 34 and, consequently, adjust the speed of material moving through piping 34. Thus, control system 90 can control the speed, density and spacing of slugs of material flowing through piping 34.

A timing system may also be used with control system 90 to time delivery of material. Using the timing system, the delivery to container 56 of a desired quantity of material may be timed. Then control system 90 can be adjusted to deliver the required quantity of material in the time allotted.

What is claimed is:

1. A method of delivering material through conduits comprising:

providing material to be transferred;

automatically introducing pulses of material into the conduit using a pulse control valve while also introducing a stream of air into the conduit using a trim valve to produce slugs of material to move through the conduit in response to a control system connected to said pulse control valve, said trim valve and a pulse velocity sensor;

monitoring the velocity of the slugs moving through the conduit using said pulse velocity sensor;

conducting the slugs through the conduit to a hopper loader; and discharging the material from the hopper loader to a container.

2. The method of claim 1 wherein the step of introducing pulses of material includes introducing pulses of material in about 2-4 second pulses and discontinuing the pulses for about 0.3 seconds.

3. The method of claim 2 further comprising decreasing the flow of the stream of air thereby increasing the density of the slugs moving through the conduit.

4. The method of claim 3 further comprising activating a vacuum pump for creating a suction in the conduit for moving the material through the conduit.

5. The method of claim 4 further comprising selectively opening valves in the conduit to selectively inject atmospheric air into the conduit for cleaning the conduit.

6. The method of claim 5 wherein the step of introducing a stream of air into the conduit includes pulsing the stream of air in about 0.1-10 second pulses.

* * * * *